(No Model.) 4 Sheets—Sheet 1.
E. M. WOOD.
GREENHOUSE.
No. 293,696. Patented Feb. 19, 1884.
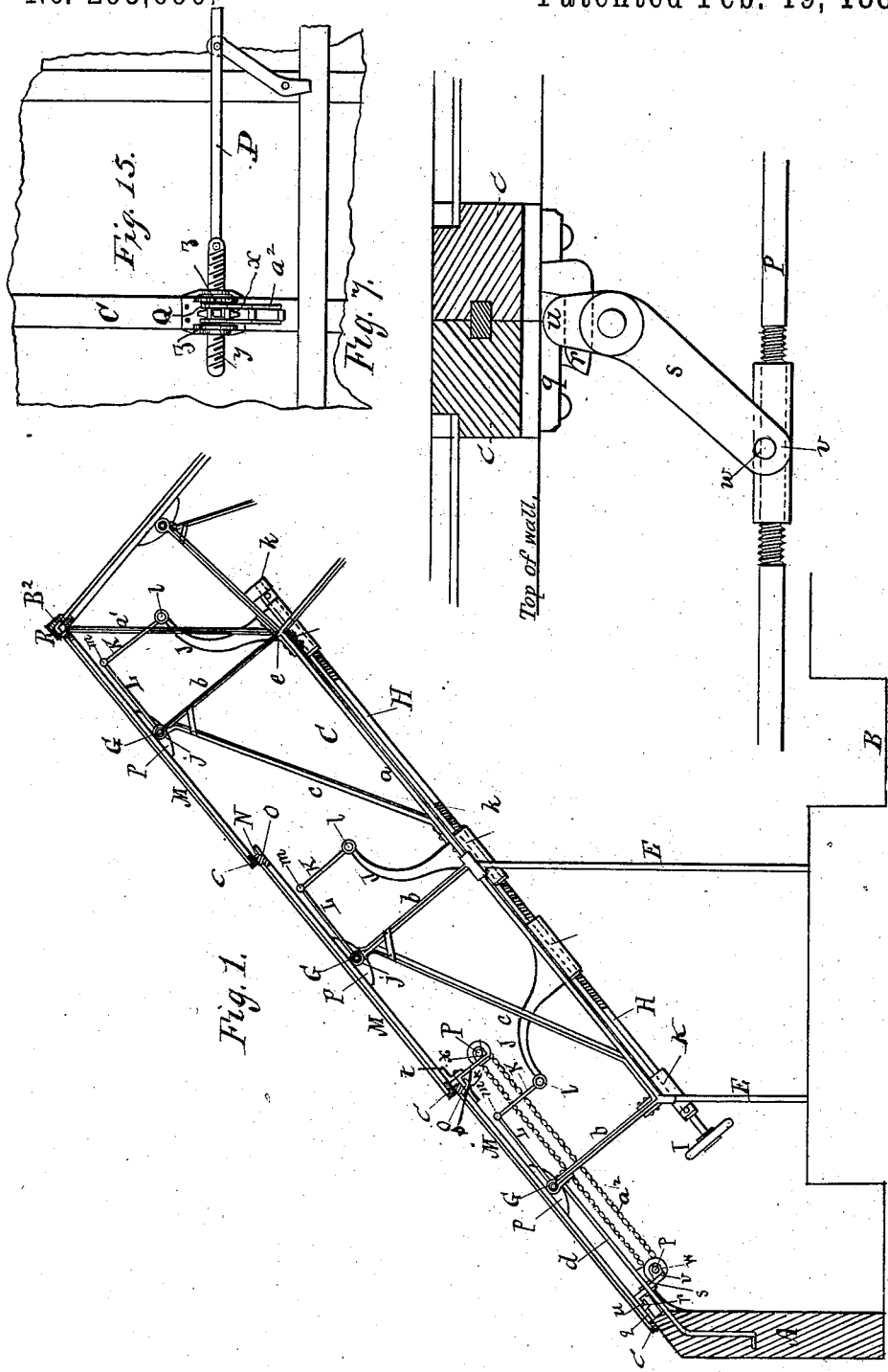
Witnesses.
S. C. Means,
W. Winch
Inventor.
Edmund M. Wood.
F. Curtis, Atty.

(No Model.) 4 Sheets—Sheet 2.
E. M. WOOD.
GREENHOUSE.
No. 293,696. Patented Feb. 19, 1884.
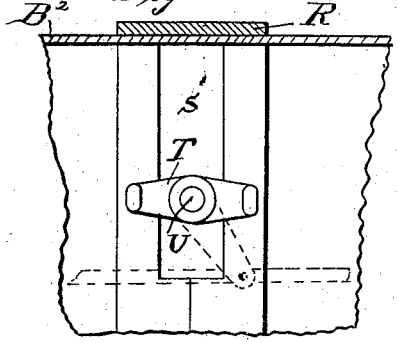
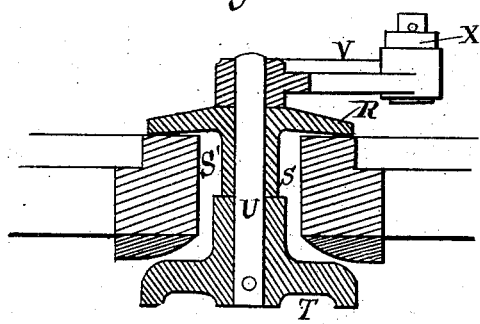
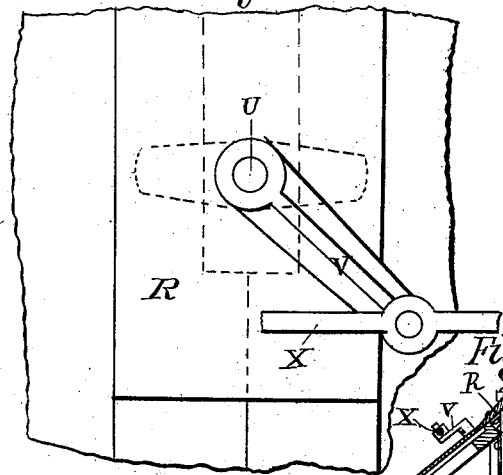
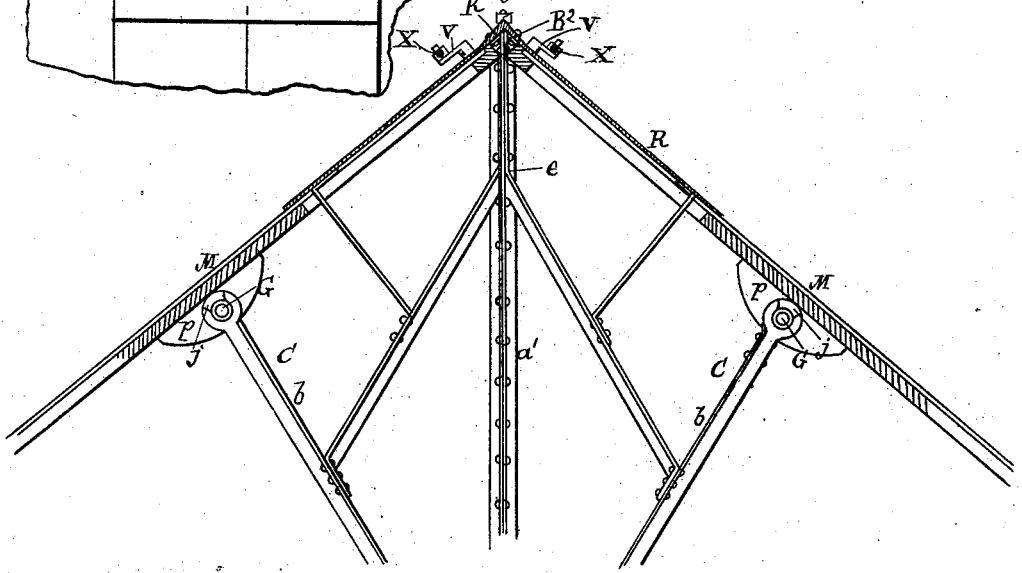
Witnesses
S. C. Means
W. Winch
Inventor
Edmund M. Wood
F. Curtis, Atty.

(No Model.) 4 Sheets—Sheet 3.
E. M. WOOD.
GREENHOUSE.
No. 293,696. Patented Feb. 19, 1884.
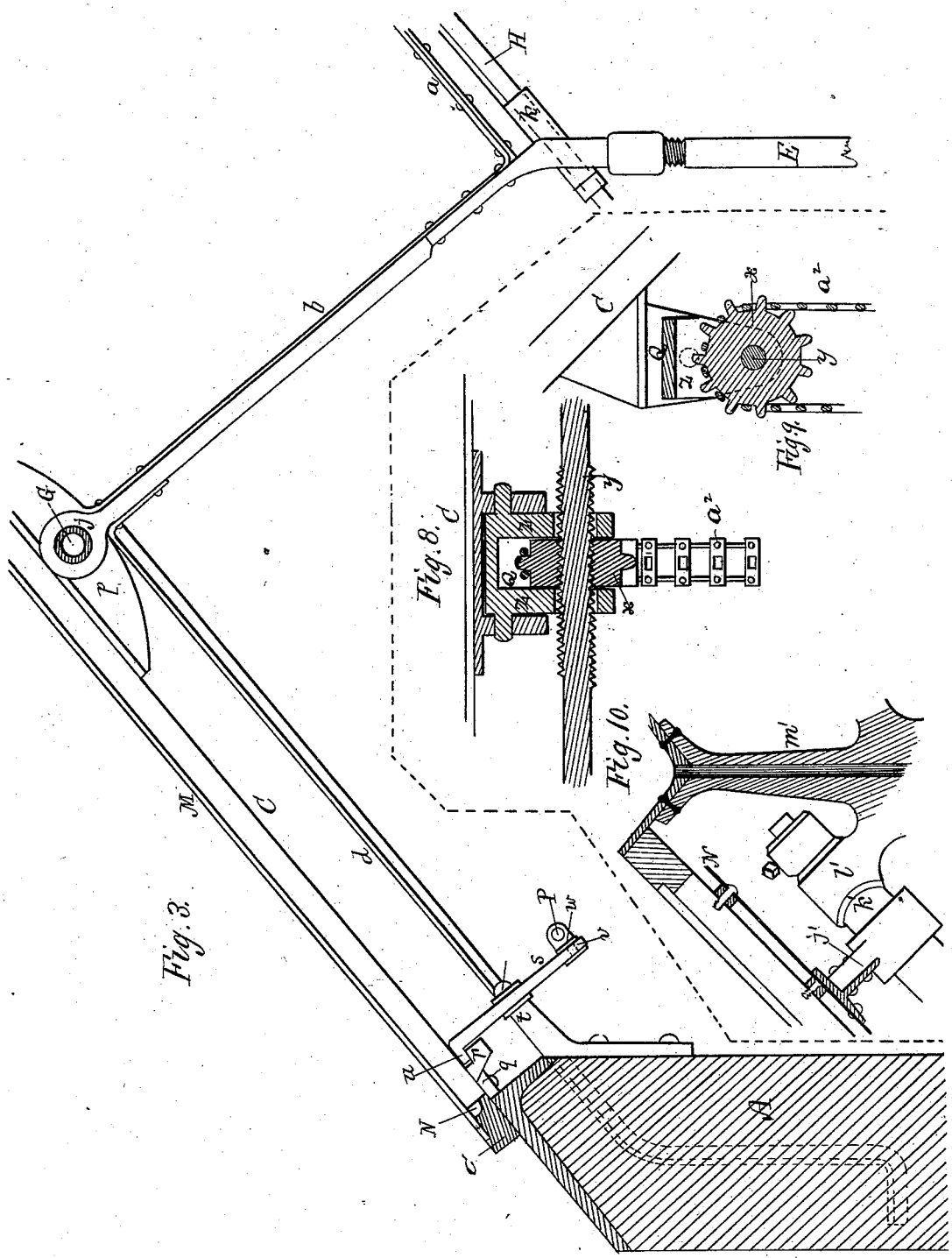
Witnesses.
S. O. Means.
W. Winch.
Inventor.
Edmund M. Wood.
J. Curtis. Atty.

(No Model.) 4 Sheets—Sheet 4.
E. M. WOOD.
GREENHOUSE.
No. 293,696. Patented Feb. 19, 1884.
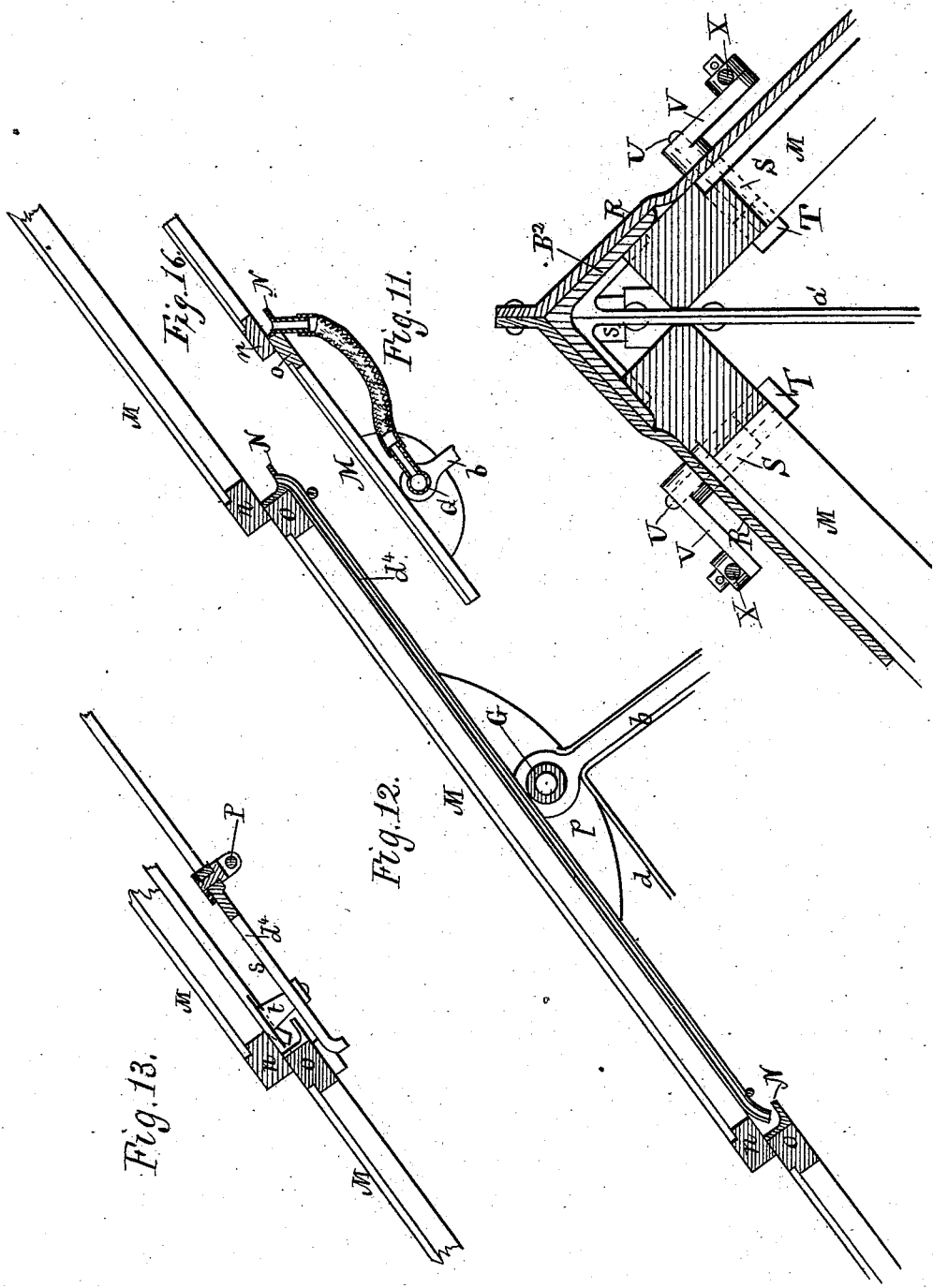
Witnesses.
S. O. Means.
W. Winch.
Inventor.
Edmund M. Wood.
J. Curtis, Atty.

UNITED STATES PATENT OFFICE.

EDMUND MORTIMER WOOD, OF NATICK, MASSACHUSETTS.

GREENHOUSE.

SPECIFICATION forming part of Letters Patent No. 293,696, dated February 19, 1884.

Application filed May 17, 1883. (No model.)

*To all whom it may concern:*

Be it known that I, EDMUND MORTIMER WOOD, a citizen of the United States, residing at Natick, in the county of Middlesex and State of Massachusetts, have invented certain new and useful Improvements in Greenhouses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the cultivation of greenhouse plants—such as roses, azaleas, &c.—whether for the plants themselves or their flowers or fruit, it is essential, in order to produce well-seasoned stocks, to insure vigorous flowering or fruiting, and larger and more abundant products, that they be at seasonable times fully exposed to the open air. Heretofore this result has been effected by one of two methods—either the plants have been removed from the greenhouse to the open ground outside, or the glazed sashes have been removed entirely from the house, so as to permit of free entrance of light and sun. The same result has been imperfectly accomplished by providing ventilation at the top or bottom or sides; but this latter method induces unequal drafts of air through the house, which endangers the perfection or the life of the plants. The removal of plants to the open ground or the removal of the sashes from the roof is attended with considerable expense, and the larger and more valuable plants cannot be readily removed, and in either event the plants are exposed to fluctuations in the weather. My invention is intended to give perfect control over the glass covering of the house, enabling such house to be changed at a moment's notice from a tightly-closed condition to an entirely open one or a partially-open one, thereby insuring any desired degree of ventilation without injurious drafts, the inflowing air being more perfectly controlled and evenly distributed and heated before having access to the plants. By my construction, also, the sashes may be presented to the rays of the sun in a position to obstruct the latter as little as possible. In the construction of my house I employ a series of sashes of practically ordinary form, and arranged side by side to form the roof, in number according to the length of house desired; and I place several of these rows of sashes in tiers one above the other, with the lower bar of one tier of sashes overlapping the upper bars of the tier next below, with the exception of the lower tier, the lower rails of which rest upon the side walls of the structure. The series of sashes of each tier are connected together by spline-and-groove or other tight connections, and are secured at about their centers to a horizontal rock-shaft extending the entire length of the house, and constituting a common pivot, whereby the sashes of the entire roof may be opened simultaneously to any desired extent, the swinging of the tier being effected by suitable mechanical devices under the control of a single attendant. The shafts which support the different tiers of sashes are mounted in bearings upheld by trusses, preferably of light wrought-iron, in order to impart a light and graceful appearance, these trusses being supported at intervals upon vertical columns erected upon the floor or foundation of the house, or embedded at their lower ends in the earth. These trusses, in addition to being light and graceful in appearance, offer little obstruction to rays of the sun or light, and occupy little space in the house. Each tier of sashes is provided with suitable locking devices at proper intervals, to maintain a close joint with the next tier, these locking devices being situated within the house, and operated simultaneously by a common connecting-rod, in order that as little time as possible may be consumed in fastening or unfastening the said tiers of sashes. I prefer, also, to add to the top of the exterior of the roof a locking device to securely close the upper edges of the upper tier of sashes, these locking devices being operated by suitable mechanism. The locking device is or may be a series of turn-buttons located upon the inside of the house, but operated from the outside; and to effect this I secure each button to a rock-shaft, which extends upward through a bearing in the ridge, and is secured at its upper end to one end of an arm, the opposite end of such arm being pivoted to a shipper-rod extending the length of the house, and connecting and operating the entire series of buttons, the various rock-shafts being each swiveled in a saddle-plate disposed upon the outside of the apex of the roof, and so situated as to cover the slots in the sashes made to clear the truss when the latter are swung open. My object in mounting and operating the sashes in the above manner is to enable such sashes to be opened easily and expeditiously and present them edgewise to the rays of the sun, in order to obstruct the latter as little as possible and not remove the sashes entirely. In the case of a very short house, or even of a long one, each tier may be a single sash, and, in fact, when all are connected to their common shaft, they are a single sash to all intents and purposes. In practice, to secure economy and ease of construction, I employ sashes of the ordinary width—three feet—and I connect them with tongues and grooves, which provide a tight joint and insure a firm connection.

The drawings accompanying this specification represent, in Figure 1, a vertical cross-section of one side of a greenhouse containing my improvements. Fig. 2 is a section of a portion of one of the trusses and the ridge. Fig. 3 is a section of a portion of one of the walls and of one of the trusses. Fig. 4 is an enlarged section of the ridge. Fig. 5 is a section, and Fig. 6 a plan, of the locking device supported by the ridge and locking the upper sashes. Fig. 7 is a plan of the inner locking devices. Figs. 8 and 9 are sections of the device for operating the shipper-rod. Fig. 10 is a view of a modified manner of pivoting the sashes. Figs. 11, 12, 13, 14, 15, and 16 are detail views of different parts of the structure.

In the above-named drawings, A A represent the side walls of a greenhouse, and B the floor or foundation of the same, substantially after the manner of greenhouses as heretofore constructed.

In carrying out my invention I employ a series, C C, of sloping trusses, of light wrought-iron, of the form substantially as shown in Figs. 1 and 2—that is, with an inner longitudinal chord, $a$, lateral cross ties or braces $b\,b$, and diagonal ties or braces $c\,c$, the latter sloping in a direction to permit of opening the sashes, as hereinafter explained.

I do not confine myself to this precise form of truss, as it may be varied from to a considerable extent without the exercise of inventive skill. The braces $c\,c$ may be omitted; but to obtain great strength I prefer to retain them; and to permit the upper edges of the sashes to open inward and downward, these diagonal braces are arranged obliquely to the longest plane of the lower chord of the truss, sloping inward at bottom. The lower ends of the trusses C are secured to the tops of the walls A by bars $d$, while the upper ends of the side bars or of said trusses are connected together, as shown at $e$.

To support the truss C firmly in position, I employ vertical columns E E, disposed at proper intervals, these columns resting upon the floor or foundation of the house, or embedded in the ground at their lower ends, while their upper ends are securely connected with the rails $a$ of the trusses. The ridge of the house is shown (see Fig. 11) as a $\wedge$-shaped metallic plate, $B^2$, extending the length of the house, and upheld at intervals by vertical supports $a'$, making part of the trusses, the sides of this saddle overlapping the upper rails of the upper tiers of sashes, as shown in Fig. 4 of the drawings.

G G in the accompanying drawings represent a series of rock-shafts extending the entire length of the house, and parallel with the roof of the latter, these shafts, like the columns E, and for the same reasons, being composed, preferably, of iron gas-pipe, and for the additional reason that I may wish to avail myself of the interior of the shaft as a conductor of water of condensation, as hereinafter explained. These rock-shafts G G are mounted in bearings $j\,j$ in the trusses C, and are disposed above one another in number equal to the number of tiers of sashes employed. Each shaft G may be rocked independently; but I prefer to operate the entire shafts upon each side of the house simultaneously by mechanical means under the control of a single attendant; and to this end I employ a screw-threaded rotary shaft, H, (see Fig. 1,) journaled in bearings $k\,k$, &c., in one of the trusses C—preferably the one in or nearest the center of the house—and to the lower end of this shaft I secure a hand-wheel, I, which is within convenient reach of the attendant. I prefer that the shaft H shall be arranged practically parallel with the slope of the roof.

J J represent a series of rigid curved arms, in number equal to the number of tiers of sashes—one to each—the lower ends of these curved arms being screw-threaded and screwing upon the shaft H, while each, at its upper end, is pivoted, as shown at $l$, to the lower end of a link, K, the upper end of each link K being in turn pivoted, as shown at $m$, to the free end of an arm, L, the base of such arm being secured to the rock-shaft G. The several tiers of sashes are shown in the drawings at M M, &c., as arranged one above the other longitudinally of the roof, with the lower rail or rails, $n$, of each tier overlapping the upper rail or rails, $o$, of the next tier below, as shown in Fig. 1. These sashes may be of metal, in order to increase their durability, reduce the size of the rails, and offer less obstruction to the rays of the sun. As shown in the accompanying drawings, however, the sashes are composed of wood in the usual manner, and of the ordinary width, (three feet,) these sashes being laid side by side in tiers extending the entire length of the house, or each section of the house, and jointed together at their abutting edges by tongue-and-groove joints, (see Fig. 7,) which exclude external air and convert the entire series of sashes of each tier into practically one sash. Each tier M of sashes is secured at about its center to the respective shaft G by checks $p\,p$, disposed at intervals, secured to the inside of each tier, and inclosing the shaft. Rocking of the shaft G (on either side of the house) in one direction by means of the screw feed-shaft H, arms J, links K, and arms L tends to turn the entire series of sash-tiers upon their supports and open them to any desired extent. By this means almost the entire, and, in fact, practically the entire, roof is open to entrance of air and sun, as the sashes may be swung at right angles to the pitch of the roof, and very little surface is presented to obstruct the rays of the sun. I prefer to place the pivotal shaft G somewhat above the center of each tier of sashes, in order that the weight of such tier may be exerted to close it, and in order that the greater area below the shaft may be acted upon by the wind in manner tending to close rather than open the tier.

To the inside edge of the upper rail of each tier, or the lower tier, of sashes I secure a gutter, N, which arrests any water of condensation dripping from the inside of the roof, thereby protecting the plants from such water. This gutter is preferably of metal, standing out from the sash, in order that if the lower rail of the sash is of wood it may be protected from the water standing in the gutter; or the gutter may be disposed flush with the glass of the sash, in order to offer the least obstruction; or it may be plowed out of the material of the upper rail of the sash.

A pipe, $d^4$, may be secured to each sash-tier, as shown in Fig. 12 of the drawings, to conduct the water from one gutter to the gutter next below it; or a flexible pipe may lead from the gutter into the wall.

To remove the water of condensation collecting in the gutter, the latter may connect with the interior of the adjacent shaft G (when the latter is tubular) by a suitable pipe, and the ends of this tubular shaft may extend entirely through the end walls of the house, in order to discharge the water outside the latter; or a flexible pipe connecting with the gutters may discharge into vessels inside the house, to receive the water.

I do not confine myself to any arbitrary construction or arrangement of the gutters, as I consider this feature of my invention to consist in the combination, with a sash adapted to rock upon its supports, of a gutter for intercepting the water of condensation dripping from such sash when closed or nearly closed.

I have now described the general structure of my house and the method of supporting and operating the sashes; and I would here remark that, in lieu of pivoting the sash-tiers upon a support extending longitudinally of the house and opening the entire tier or sections of tiers in the direction explained, an alternative method would be to pivot each individual sash upon a support extending transversely of the roof and longitudinally of the sash, but operating the entire number of sashes of a vertical tier or series or section of a tier simultaneously.

I have described the entire number of sashes of a tier as secured together and operating as one sash, and my own extensive cluster of houses is operated in this manner; but it may be found desirable in some instances to divide up the tier into sections of two or more sashes and operate each section independently. In the case of a jog in the house it will be necessary to thus divide the tier, and it will be necessary also to employ a train of gears or their equivalent to connect the shafts G of the various sections of the house, if it is desired to connect and operate the entire series of tiers simultaneously. This latter arrangement I also employ in some of my own houses.

I will now describe the manner of fastening or locking the sashes when closed, to seal the joint between them and prevent entrance of external air.

At suitable intervals throughout the length of each tier or section of sashes I apply a device constituted as follows: To the lower rail, $n$, of each tier I secure at intervals a swinging latch, $s$, pivoted to a bracket, $t$, secured to the under side of such rails, the nose of this latch taking under the upper rail, $o$, of the sash next below, thereby preventing rising of the lower part of each tier. (See Figs. 1 and 3.) In the case of the lower tier of sashes the latch $s$ is employed, but is pivoted to the top of the wall, and upon its nose is formed a lip, $u$, to engage a lug, $r$, formed upon a plate, $q$, secured to the lower rail, $n$, of the lowest tier of sashes. (See Figs. 3 and 7 of the drawings.) With each tier of sashes I employ a horizontal shipper-rod, P, running the entire length of the house or section of house, and I swivel the lower ends or tails, $v$, of each range of latch-bars $s$ to this shipper-rod, as shown at $w$, thereby connecting and simultaneously operating the entire latches of the tier. Prior to opening the sashes the attendant seizes one end of the shipper-rod P and moves the same longitudinally in the proper direction, and thereby releases the latches $s$ from the lugs $r$ and unlocks the entire tier of sashes. A longitudinal movement of the rod P in the opposite direction reverses the motion of the latches and locks the sashes. If it is desired to simultaneously operate the locking devices of all the tiers, the various shipper-rods P must be moved in unison. To effect this I provide each shipper-rod with a longitudinal extension or short shaft, $y$, which is pivoted to one end thereof, as shown in Fig. 15, and receives an internally screw-threaded sprocket-wheel, $x$. The sprocket-wheels $x$ of the various screw-threaded shafts $y$ are connected by endless chains $a^3$, and are journaled in the ears $z$ of brackets Q. These brackets are pivotally attached, as shown in Figs. 8 and 9, to the respective sashes C, and hold the sprocket-wheels motionless. In consequence the rotation of said wheels draws the shafts $y$ toward and through them, or forces said shafts in the opposite direction, and this endwise motion of said shafts is of course transmitted to the shipper-rods P, with the result of simultaneously locking and unlocking the sashes, as stated.

I prefer, as before stated, for perfect security, to add a locking device to the upper bars of the uppermost tier of sashes. In carrying out this feature I add to the ridge B² of the roof, opposite each truss upon each side, a saddle, R, (see Figs. 5 and 11,) against the under side of which the upper part of the upper sash-tier closely abuts, this saddle having a central rib, S, pendent from it, (see Fig. 5,) which extends between the adjacent side rails of the two opposite upper sash-tiers, these rails being rabbeted or notched at this point, as shown at S'; or, in lieu of this continuous rib S, a hub may be employed to each fastening. To the under side of the saddle, opposite each truss, I add a turn-button, T, which is secured to the lower end of a rock-shaft, U, which extends upward through a bearing in the saddle, and has affixed to its upper end, above such saddle, the base of an arm, V, the free end of each arm V being pivoted to a common shipper-rod, X, which extends the entire length of the roof, and by means of which the entire series of buttons T are operated. This shipper-rod may be operated by hand or by suitable mechanical means from the outside or the inside of the house, as may be preferred. The width of each turn-button is somewhat less than the width of the opening S' between two adjacent sashes of the same tier, while the length of each button is considerably greater than the width of such opening. Consequently, when the buttons are turned by their common shipper-rod to a position lengthwise with this opening, the sash-tiers are unlocked and may be opened. Reversing the position of the buttons causes them to span the openings S' and lock the sash-tiers. The saddle R, or wings of the same, covers the openings S' and prevents access thereat of external air or dust.

If the sashes are to be pivoted independently at right angles to the longest plane of the house, I shall secure to the inside upper and lower parts of each, and centrally thereof, or about so, (see Fig. 10,) a bracket, j', which incloses and is secured to a shaft, k', journaled at its ends in bearings l', secured to or formed upon vertical columns m', &c., erected upon the floor of the house. To the upper ends of the columns m', I secure the ridge, which in this instance, and with the other construction of house also, may be an inverted-V shape, as shown in Fig. 10. In this form the ridge constitutes a gutter to arrest a certain amount of moisture falling upon the roof, which can escape through the bores of the columns.

I claim—

1. In greenhouses, and as a support to the roof, light metal trusses of suitable shape to permit of tilting of the sashes, either individually or collectively, in combination with a series of sashes adapted to swing at about their centers upon their supports, substantially as explained.

2. In combination with the side walls, the roof-trusses composed of the longitudinal side bars, right-angular lateral ties, and diagonal braces, which latter permit tilting of the sashes, substantially as explained.

3. In greenhouses, a series of sashes adapted to swing at about their centers either laterally or longitudinally upon their supports, and operated by suitable mechanical means, whereby they may be swung collectively and simultaneously upon their supports.

4. In greenhouses, a tier of sashes swinging at about its center, collectively, upon its supports, a rock-shaft supporting such tier, and light metal trusses supporting such rock-shaft and adapted to permit of swinging of the tier.

5. The inverted ridge crowning the roof of the house, and operating as a gutter to collect water.

6. The inverted ridge, in combination with conductors for conveying off the water arrested by such ridge.

7. In combination with a sash adapted to swing at about its center, a tubular shaft, constituting the pivotal support of such sash, and provision for conducting drip-water from the sash to the interior of such shaft.

8. The saddle, in combination with the pivotal sashes and the trusses supporting the same, such saddle constituting the support or bearings of the devices for locking the upper sashes.

9. The saddle, in combination with the pivotal sashes and the trusses supporting the same, such saddle constituting the support of the devices for locking the upper sash and a covering for the openings in or between such sashes, through which the said locking devices operate to fasten the sash.

10. The device herein explained for locking the upper sash, consisting of the shafts U and turn-buttons T, the shaft being mounted in the saddle R, and provided with the arms V, which are connected and operated by the rod X.

11. The openings S' in the sashes, in combination with the saddle R, or its equivalent.

12. The device herein shown and explained for locking the sashes, consisting of the latches s, with their lips u, and the plates q, with their lugs r, the latches being preferably connected and operated by the rod P.

13. In greenhouses containing two or more tiers of sashes so arranged that the lower edge of one tier overlaps the upper edge of the tier next below, a series of devices for locking such edges together, when such series of devices are operated collectively by mechanical means.

In testimony whereof I affix my signature in presence of two witnesses.

EDMUND MORTIMER WOOD.

Witnesses:
F. CURTIS,
S. O. MEANS.